Patented Sept. 22, 1931

1,824,668

UNITED STATES PATENT OFFICE

JOHN WILLIAM HASSELKUS AND OWEN GEORGE HAY, OF LONDON, ENGLAND

INTERFEROMETER FOR THE TESTING OF OPTICAL ELEMENTS

Application filed October 19, 1928, Serial No. 313,568, and in Great Britain January 3, 1928.

The invention relates to interferometers for the testing of optical elements such as prisms, lenses, plano-parallel plates and reflecting surfaces or combinations of such elements, and may be considered as a development or extension of the invention described in British patent specification, No. 103,832. According to the invention therein set forth, a Michelson's interferometer is applied for the testing of optical elements, but in practice, with the apparatus described, the dimensions of the elements to be tested are limited by mechanical and other difficulties.

The main object of the present invention is to provide improved apparatus of the kind indicated, especially applicable for the testing of optical elements of comparatively large dimensions.

With such an object:—

The present invention consists in apparatus of the kind in question in which the beams from the centre mirror used for reference and testing respectively are associated in such a way that errors of movement of one part of the apparatus relatively to another during the carrying out of a test affect both beams in a compensatory manner.

More specifically, the invention consists in directing the two beams by reflecting surfaces to the testing and reference elements, the reflecting surfaces being mounted on a common frame or carriage.

Thus, for example, by passing one beam from the centre mirror over successive areas of the element to be tested and simultaneously passing the other beam over the reference element, the imperfections of the former as compared with the latter will become apparent in the form of contour maps in proper relation to one another.

Referring to the accompanying drawings which illustrate diagrammatically different forms of the invention by way of example:—

Figure 1 shows a plan and

Figure 2 a corresponding elevation of one form of the invention;

Figure 3 shows a plan of a simplified form; while

The same reference letters are used in the different figures to denote corresponding parts.

Figure 1:
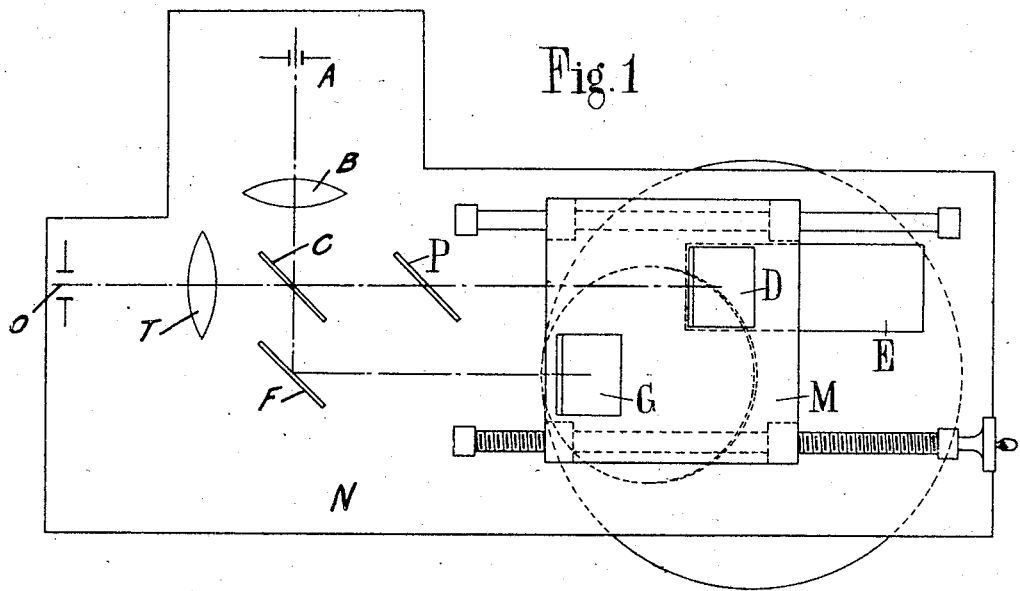
Figure 2:
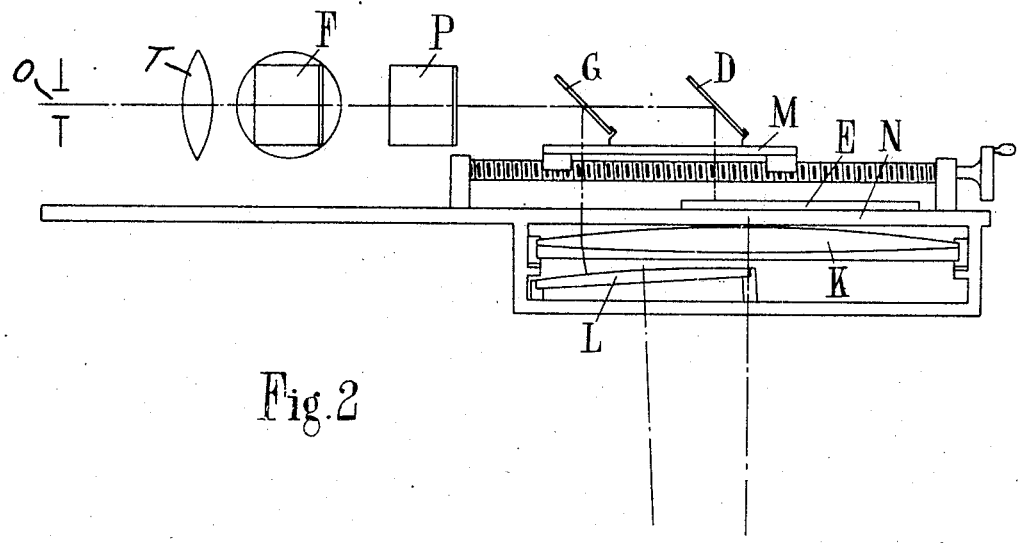

In carrying the invention into effect according to one form as shown in Figures 1 and 2, light from any suitable source is passed horizontally through the diaphragm, A, and rendered parallel by the convergent lens, B. The parallel beam so formed falls on to the vertical lightly-silvered or centre mirror, C, placed at an angle to the beam of 45°, the beam reflected therefrom being passed to a plane mirror, D, arranged at an angle of 45° with the vertical, (hereinafter called the "reference-beam mirror") whence it is reflected vertically downwards to the horizontal plane reference mirror, E, on which it falls at right angles so as to return to the centre mirror along its original path and pass therethrough to the eye of the observer at O. The other beam, or test beam, which has passed through the lightly-silvered centre mirror, C, is reflected by a vertical plane mirror, F, placed at 45° to the incident beam so as to be parallel to the reference beam and is in like manner given a downward vertical direction by the plane mirror, G, (hereinafter called the "test-beam mirror") arranged at an angle of 45° with the vertical. The test beam having passed through the element to be tested, e. g., the telescope objective, K, falls on a spherical convex mirror, L, the centre of which is coincident with the focus of the object glass under test, and is returned to the centre mirror to pass thence to the observer.

The reference-beam and test-beam mirrors, D and G, are according to the form of the invention under description adjustably mounted on a common carriage, M, movable on the frame, N, of the instrument so that any errors of movement of this carriage when making a test affect both mirrors and consequently both beams to a corresponding extent.

By moving the common carriage so that the test-beam mirror, G, traverses a radial path in relation to the objective under test and by rotating the objective about its own optical axis at intervals, the whole of the objective can be examined part by part, the contour maps of successive parts being in correct relation to one another.

In order to be able to carry out a complete survey of the surface of the objective, the diameter of the convex mirror, L, and the length of the plane reference mirror, E, should be not less than the radius of the objective under test.

To compensate for small movements of the kind which cause the displacement of the interference bands laterally without altering their angle or shape, a plano-parallel plate, P, may be introduced at a suitable angle into either of the beams.

Figure 3:
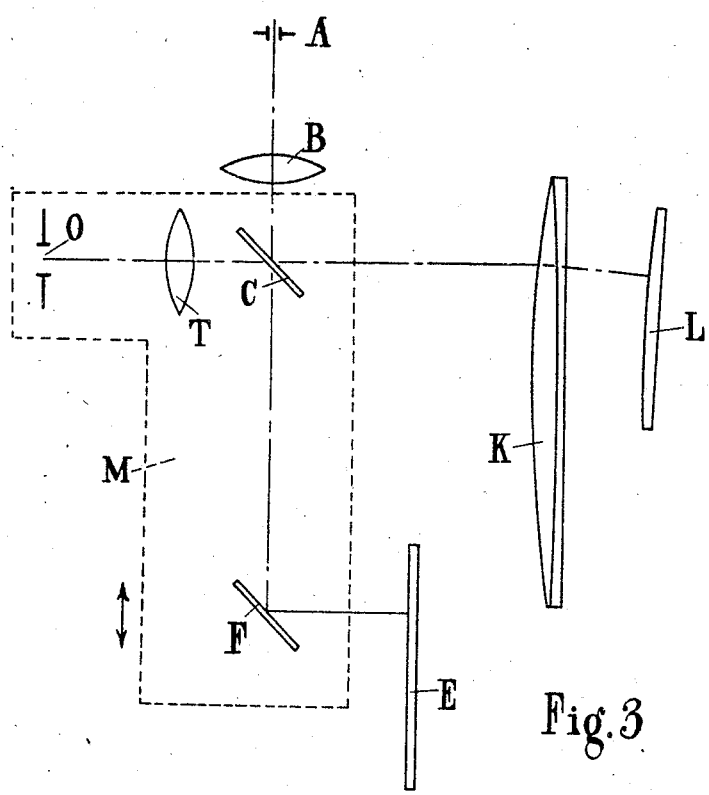

In Figure 3, a simplification of the form of the invention described is shown in which the mirrors, D and G, are omitted and the objective, K, spherical mirror, L, and plane mirror, E, are correspondingly arranged as shown. In this case, the mirrors, C and F, together with the viewing lens, T, and the eye aperture, O, are mounted on the common carriage, M, which is arranged so as to be movable to and fro as indicated by the arrows.

By replacing the convex spherical mirror, L, by a plane reflecting mirror, the above apparatus may be adapted to the testing and figuring of large plano-parallel plates.

For the testing of a large telescope objective in the manner described above, it is necessary that the convex spherical mirror, L, should be of a high degree of accuracy, that is to say, the surface of the mirror should be truly spherical within one-tenth of a wave length of light and a further part of the present invention is suitable for testing the accuracy of such a mirror.

Figure 4:
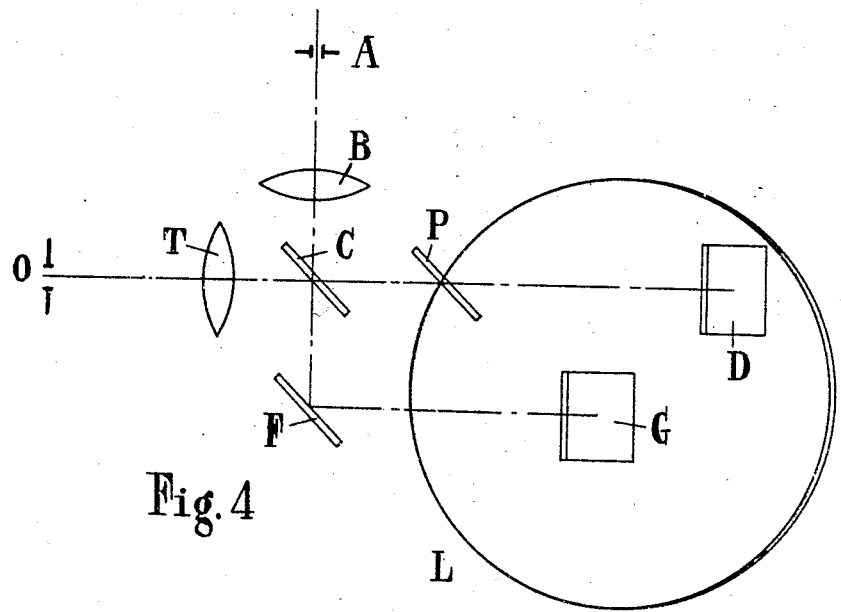
Figures 4 and 5 show a plan and elevation of a modification.
Figure 5:
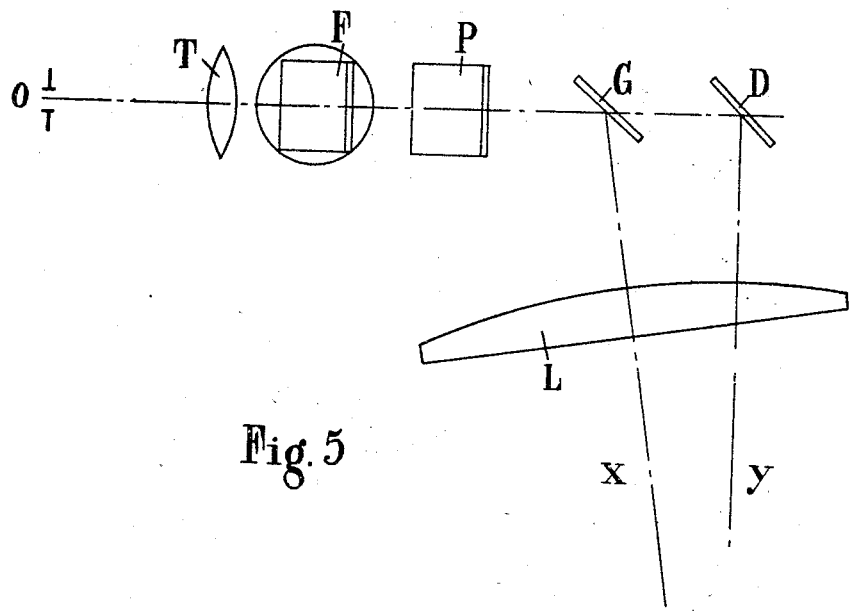

According to this part of the invention, (see Figures 4 and 5) convergent or divergent beams pass as before from the centre mirror, C, respectively to the mirrors, D and G, adjustably mounted on the frame of the instrument, these mirrors being at such an angle that the two beams from them fall normally on the spherical mirror to be tested.

With such an arrangement, a test may be conducted in two stages, as follows:—

During the first stage, the beam from the mirror, G, now serving as the reference beam, falls on a central area of the spherical mirror, L, and the test beam from the mirror, D, on part of an annular zone, the symmetry of which is then tested by rotating the spherical mirror about the axis, $x$, of the reference beam, the interferometer as a whole including the test-beam and reference-beam mirrors being stationary.

During the second stage, the functions of the two beams are interchanged, the reference beam from D falling on a part of an annular zone and the test beam from G on a central area of the mirror which, to test for zonal aberrations, is then swung as a whole to and fro about the vertical axis, $y$, of the reference beam, the interferometer itself being kept stationary as before.

Alternatively, instead of moving the spherical mirror and keeping the interferometer stationary, the interferometer itself may be moved about the relative axis and the mirror kept stationary.

It will be seen that in this application one beam is used as a reference beam to test for lack of symmetry while the other is used as a reference beam to test for zonal aberrations of the test surfaces, any error due to the necessary testing movements which affects one of the beams, affecting the other beam to a corresponding extent.

A similar procedure may be used in testing non-spherical surfaces such as paraboloids, but in this case a definite amount of angular deviation between the two beams, determined by calculation, must be introduced as a correction.

The testing of large plane surfaces may be carried out in a manner similar to that indicated above, the two axes of rotation, $x$ and $y$, being in this case parallel.

Although the words "horizontal" and "vertical" have been used in order to make clear the paths of the beams in the particular form of the invention described, such words are not intended to have a restrictive effect on the scope of the invention, since the instrument may be used in other positions and in particular the desired effects, subject to the maintenance of the fundamental relation between the test-beam and reference-beam mirrors, may be obtained with other relative positions of the optical components of the apparatus.

Apart from the advantages pointed out above, the present invention enables a quantitative idea of the errors of the test element to be obtained; in addition no accurately machined and optically worked bearing surfaces are necessary, while approximate equality of optical path, automatically maintained between the reference beam and the test beam produces a well-defined interference pattern at all times during a test.

Various modifications of the particular forms of the apparatus described above may be made without exceeding the scope of the invention.

Having now described our invention, what we claim as new and desire to secure by Letters Patent is:—

1. In an interferometer for testing optical elements, of the kind utilizing a beam of light split into a test beam and a reference beam, the combination of a test-beam mirror directing said test beam to a test object and a reference-beam mirror directing said reference beam to a reference object; a common support for said directing mirrors; and means for permitting a relative movement between said common support for said mirrors and said test object, said relative movement being transverse to said beam impinging on said test object.

2. The combination of parts in an interferometer claimed in claim 1, in which said common support for said directing mirrors takes the form of a movable carriage.

3. In an interferometer for testing optical elements, the combination of means for splitting a beam of light into a test beam and a reference beam; mirrors one each in the paths of said reference beam and test beam; and a common movable support on which said mirrors are mounted.

4. In an interferometer for testing optical elements, the combination of a half-silvered mirror through one part of which a reference beam passes to and from a reference mirror and through another part of which a test beam passes to and from a test object; other mirrors one each in the path of said reference beam and said test beam; and a common movable support on which said other mirrors are mounted.

In testimony whereof we have signed our names to this specification.

JOHN WILLIAM HASSELKUS.
OWEN GEORGE HAY.